(12) United States Patent
Ohtsubo et al.

(10) Patent No.: US 6,627,168 B1
(45) Date of Patent: Sep. 30, 2003

(54) METHOD FOR GROWING DIAMOND AND CUBIC BORON NITRIDE CRYSTALS

(75) Inventors: Hirohiko Ohtsubo, Nagano (JP); Tetsuro Sakurai, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 62 days.

(21) Appl. No.: 09/676,094

(22) Filed: Oct. 2, 2000

Related U.S. Application Data
(60) Provisional application No. 60/157,076, filed on Oct. 1, 1999.

(51) Int. Cl.[7] .......................... C01B 21/00; C01B 35/00; C01B 31/06
(52) U.S. Cl. ....................................... 423/290; 423/446
(58) Field of Search ................................ 423/446, 290

(56) References Cited

U.S. PATENT DOCUMENTS

| | | | |
|---|---|---|---|
| 4,547,257 A | * | 10/1985 | Iizuka et al. |
| 5,772,756 A | | 6/1998 | Davies et al. |
| 5,980,982 A | * | 11/1999 | Degawa et al. |

FOREIGN PATENT DOCUMENTS

| | | |
|---|---|---|
| EP | 0 322 217 A | 12/1988 |
| JP | 59-169910 A | 9/1984 |
| JP | 61-117106 A | 6/1986 |
| JP | 11-197489 | * 7/1999 |

OTHER PUBLICATIONS

Patent Abstracts of Japan, abstracting JP 61117106, Jun. 4, 1986.
Patent Abstracts of Japan, abstracting JP 59169910, Sep. 26, 1984.

* cited by examiner

*Primary Examiner*—Steven Bos
(74) *Attorney, Agent, or Firm*—Sughrue Mion, PLLC

(57) ABSTRACT

An object of the present invention is to provide a method for producing diamond and cubic boron nitride crystals having excellent mechanical strength and high regularity in particle size with high productivity, wherein seed crystals are efficiently placed in a regular pattern on a supporting plate or a raw material plate. A method for growing diamond and cubic boron nitride crystals at a pressure and temperature within the stable region of diamond or cubic boron nitride, includes stacking a supporting plate and a raw material plate, and placing a plurality of seed crystals such that the crystals come in contact with the supporting plate, placing the seed crystals in a regular pattern on the supporting plate or the raw material plate by means of placing the seed crystals on an adhesive sheet through pores formed in a regular pattern, transferring the regularly-placed seed crystals on the adhesive sheet onto the surface of the supporting plate or the raw material plate and pressing the crystals against the surface. The supporting plate or the raw material plate is used for growing the crystals.

12 Claims, 2 Drawing Sheets

METHOD FOR GROWING DIAMOND AND CUBIC BORON NITRIDE CRYSTALS

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/157,076 filed Oct. 1, 1999 pursuant to 35 U.S.C. §111(b).

FIELD OF THE INVENTION

The present invention relates to a method for growing diamond and cubic boron nitride crystals, and more particularly to a method for growing diamond and cubic boron nitride crystals having excellent mechanical strength and high regularity in particle size with high productivity, wherein seed crystals are efficiently placed in a regular pattern when diamond and cubic boron nitride are produced at ultra high pressure and high temperature.

BACKGROUND OF THE INVENTION

In the production of diamond and cubic boron nitride crystals by means of a hydrostatic pressure method, an important factors for producing well-shaped crystals having few inclusions is to suppress the amount of generated crystal nuclei and to grow the crystals at a temperature and pressure in the vicinity of the phase equilibrium curve. Employment of seed crystals is an effective measure for suppressing the amount of generated crystal nuclei.

Even if the amount of crystal nuclei is suppressed, the temperature and pressure of a reaction portion must be maintained in the vicinity of the phase equilibrium curve in the stable region of the above-described high-pressure-phase substances. However, in an industrial ultra-high-pressure production apparatus, controlling the temperature and pressure of the reaction portion at the desired value is difficult. Therefore, even if seed crystals are employed, it is difficult to produce, with high productivity, diamond and cubic boron nitride crystals having a narrow grain size distribution, high percentage of crystal growth, and excellent mechanical characteristics, such as thermal toughness index and compressive fracture strength.

Japanese Patent Application Laid-Open (kokai) Nos. 68395/1986 and 68398/1986 disclose a method wherein seed crystals having a particular grain size are placed in a regular pattern on a supporting plate or a raw material plate (non-diamond carbon species and low-pressure-phase boron nitride), in order to control surrounding temperature and pressure of seed crystals serving as reaction portions. These publications disclose specific methods, including a method wherein seed crystals are placed into depressions formed on a supporting plate or a raw material plate.

SUMMARY OF THE INVENTION

In the above-described method for placing seed crystals in depressions formed on a plate, in order to place the seed crystals into the depressions efficiently, the seed crystals must be plated with metals (in the case of diamond crystal), or must be coated with alkali metals or nitrides (in the case of cubic boron nitride). However, seed crystals having a predetermined alloy composition are difficult to obtain by metal plating, and migration of impurities cannot be avoided in the plating process. In addition, the seed crystals coated with alkali metal or nitride are very susceptible to contamination. As a result, the produced crystals are of poor quality.

Meanwhile, since the depression is slightly larger than the seed crystal, the crystal may fall from the depression when the plates are stacked.

Furthermore, the above-described method requires a step for forming depressions on a supporting plate or a raw material plate and a step for plating seed crystals, and therefore, the method provides inefficient productivity.

The above-described publications also disclose a method for pressing seed crystals against a supporting plate or a raw material plate, but do not disclose a specific example for carrying out the method efficiently.

In order to overcome the above-described drawbacks, the present invention provides a method for producing diamond and cubic boron nitride crystals having excellent mechanical strength and high regularity in particle size with high productivity, wherein seed crystals are efficiently placed in a regular pattern on a supporting plate or a raw material plate (non-diamond carbon and low-pressure-phase boron nitride), and the temperature and pressure of a reaction portion are controlled at desired values in an industrial ultra-high-pressure production apparatus.

DESCRIPTION OF THE PREFERRED EMBODIMENTS

Figure 1:
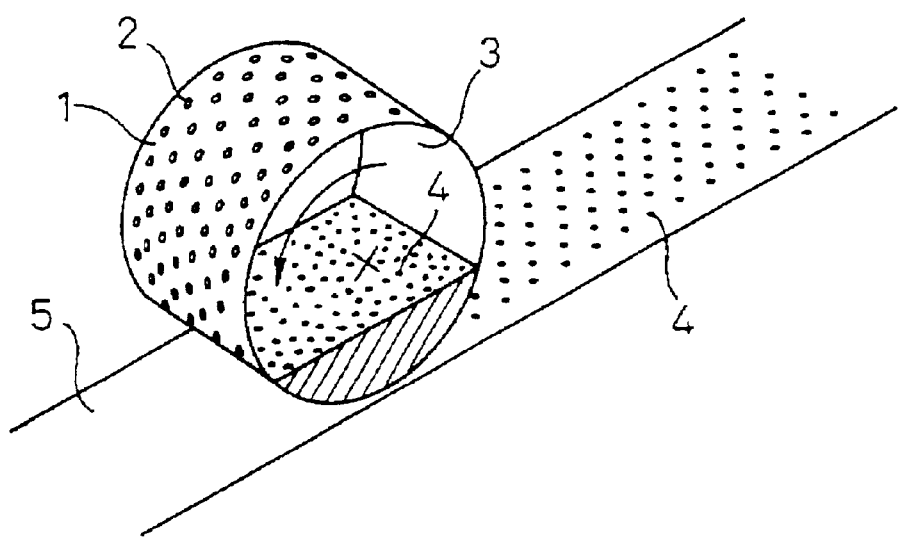
FIG. 1 is a schematic representation showing a process for placing seed crystals in a regular pattern on an adhesive tape after the seed crystals are placed into a rotary drum having pores (sieve portion) arranged in a regular pattern on the circumferential surface.

The present invention has been accomplished on the basis of a finding by the inventors, as described below in (1).

(1) A method for growing diamond or cubic boron nitride crystals at a pressure and temperature within the stable region of diamond or cubic boron nitride, which comprises stacking a supporting layer and a raw material layer formed of non-diamond carbon species or low-pressure-phase boron nitride, and placing a plurality of seed crystals such that the crystals come in contact with the supporting layer, wherein the seed crystals are placed in a regular pattern on a supporting plate or a raw material plate by means of placing the seed crystals on an adhesive sheet through pores formed in a regular pattern, and transferring the regularly-placed seed crystals on the adhesive sheet onto the surface of the supporting plate or the raw material plate and pressing the crystals against the surface; and the supporting plate or the raw material plate is used as the supporting layer or the raw material layer for growing the crystals.

Preferred embodiments of the present invention are described below.

(2) A method for growing crystals according to (1), wherein the seed crystals are placed in a regular pattern on the adhesive sheet by means of placing the seed crystals into a rotary-drum-type vessel having pores arranged in a regular pattern on the circumferential surface, rotating the vessel along with the adhesive sheet, and causing the seed crystals to adhere through the regularly-patterned pores of the vessel onto the adhesive sheet.

(3) A method for growing crystals according to (1) or (2), wherein the seed crystals are transferred onto the surface of the supporting plate or the raw material plate and are pressed against the surface, after which the supporting plate or the raw material plate is peeled off the adhesive sheet.

(4) A method for growing crystals according to any one of (1) to (3), wherein the raw material plate is stacked on the surface of the supporting plate on which the seed crystals are placed in a regular pattern.

(5) A method for growing crystals according to any one of (1) to (4), wherein another supporting plate is stacked on the surface of the supporting plate on which the seed crystals have been placed in a regular pattern, and the raw material plate is stacked on the thus-obtained laminate.

(6) A method for growing crystals according to any one of (1) to (5), wherein the supporting plate is formed of a metal selected from among iron, cobalt, and nickel.

(7) A method for growing crystals according to any one of (1) to (6), wherein the pores have a size such that only one of the seed crystals passes through each pore; i.e., two of the seed crystals cannot pass through simultaneously, and the pores are formed at a constant interpore pitch.

(8) A method for growing crystals according to any one of (1) to (7), wherein the thickness of the adhesive sheet is one-half or less the mean particle size of the seed crystal.

In the case of diamond, non-diamond carbon species such as graphite and amorphous carbon are used as a raw material. In the case of cubic boron nitride, low-pressure-phase boron nitrides such as hexagonal boron nitride are used as a raw material.

In the case of diamond, as a supporting material there may be used group 8 metals, such as iron, cobalt, and nickel, chromium, and tantalum, which are generally used as a supporting metal in the production of diamonds. In the case of cubic boron nitride, as a supporting material there may be used alkali metals, such as lithium, alkaline earth metals such as calcium and magnesium, nitrides of alkali metals and alkaline earth metals, such as $Li_3N$ and $Ca_3N_2$, and composite nitrides of alkali metals and alkaline earth metals, such as $CaBN_2$ and $Li_3BN_2$.

In the case of diamond, other metals and compounds may be incorporated into a supporting metal in an amount of 50 wt. % or less based on the entire weight of the supporting metal, in order to suppress dissolution of carbon into the supporting metal and to prevent contact between diamond species and carbon. In addition, these metals and compounds serve as an immobilizing agent for preventing invasion of oxygen and nitrogen into diamond. Examples of the metals and the compounds include Mg, Ca, Ti, Zr, V, Nb, Zn, Y, Mo, W, Cu, Au, Ag, Si, B, Al, Ge, In, Sm, Pb, carbides, and borides. In the case of cubic boron nitride, in order to suppress the growth rate of crystals and to produce well-shaped crystals, elements such as Si; Mo, Zr, Ti, Al, Sn, Pt, Pb, B, and C, and silicides, borides, and nitrides of these elements may be incorporated into a raw material in a small amount.

Examples of embodiments wherein a raw material layer and a supporting layer are stacked and seed crystals are placed on the supporting layer may include an embodiment where seed crystals are placed on the interfacial surface between a raw material layer and a supporting layer (Japanese Patent Application Laid-Open (kokai) Nos. 68395/1986 and 68398/1986); and an embodiment where seed crystals are placed between raw material layers, and another raw material layer is stacked on at least one of the layers (Japanese Patent No. 2546558). In these embodiments, layers may be stacked repeatedly, and no limitation is imposed on the number of layers to be stacked.

In the present invention, a raw material layer or supporting layer, which seed crystals are pressed against, must be a raw material plate or a supporting plate, but another raw material layer or supporting layer may be formed from foil or powder material in a crystal production apparatus. However, in view of productivity, all raw material layers or supporting layers are preferably raw material plates or supporting plates, since such plates are stacked with ease. The present invention will be described by way of examples where raw material plates are used as raw material layers and supporting plates are used as supporting layers. (When raw material layers and supporting layers are formed from foil or powder materials, raw material plates and supporting plates as described below may be formed from foil or powder materials.)

The present invention is applicable to the following: seed crystals are pressed against a raw material plate, and seed crystals are pressed against a supporting plate. As a minimum requirement, the seed crystals must come in contact with the supporting plate. Therefore, even when the seed crystals are pressed into the raw material plate completely, it is satisfactory to place the supporting plate onto the surface in which the seed crystals are pressed although, in such a case, strictly speaking, the seed crystals may not come into contact with the supporting plate. In order to bring the seed crystals into contact with the supporting plate, in practice, the seed crystals are preferably pressed against the supporting plate, in particular preferably a supporting metal plate, in consideration of ease of operation.

In order to place seed crystals in a regular pattern on an adhesive sheet, the seed crystals are transferred onto the sheet through pores formed in a regular pattern. The present invention may be carried out by use of a sieve serving as a tool having pores formed in a regular pattern for this purpose, and the type of the tool is not particularly limited. However, in consideration of efficiency, the seed crystals are preferably placed on the adhesive sheet as shown in FIG. 1. Seed crystals 4 are placed into a rotary-drum-type vessel 3 having pores 2 formed in a regular pattern on the circumferential surface 1. Subsequently, the rotary drum 3 is rotated along with an adhesive sheet 5, and the seed crystals 4 are placed on the adhesive sheet 5 through the pores 2 from the rotary drum 3, to thereby place the seed crystals 4 in a regular pattern on the adhesive sheet 5. Thus, by employment of the rotary drum, the seed crystals can be continuously placed in a regular pattern on the adhesive sheet at high speed.

No particular limitation is imposed on the size of a seed crystal, but a typically-used seed crystal has a particle size of 20–200 µm. When the particle size is less than 20 µm, dissolution of the crystal may occur upon occurrence of change in generated pressure, whereas when the particle size is in excess of 200 µm, the area of surface contact may become large and the crystals may tend to include impurities. In the present invention, the seed crystals do not require plating, but the seed crystals may be subjected to plating by use of materials of a supporting plate or other materials, in order to impart roundness or antistatic performance to the crystal.

Figure 2:
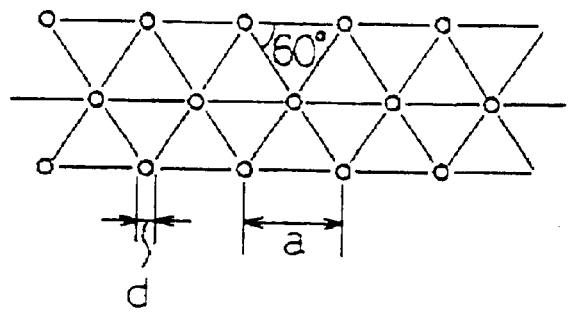
FIG. 2 shows a pattern of pores formed on a sieve portion at equal interpore pitch as an example showing regularity.

For convenience of explanation, a portion having pores formed in a regular pattern will be referred to as a sieve portion. The dimension of the pore in the sieve portion is determined on the basis of the dimension of a seed crystal. Preferably, the dimension of the pore is slightly larger than that of the seed crystal. No particular limitation is imposed on the shape of the pore, and both a round pore and a mesh pore are available. FIG. 2 shows an example pore pattern, and "d" in the figure represents the dimension of the seed crystal. For example, when the seed crystal has a dimension of mesh size #140/170 (106–90 µm), the pore preferably has a mesh size of 1 to 3 steps larger than #140; for example, a diameter corresponding to #100 (d=150 µm) or a diameter corresponding to #120 (d=125 µm). When the seed crystal has a dimension of mesh size #325/400 (maximum: approximately 50 µm), the pore preferably has, for example, a diameter corresponding to #200 (d=80 µm) or a diameter corresponding to #230 (d=63 µm).

No particular limitation is imposed on the pattern according to which the pores are arranged, but the pores are preferably formed at a constant interpore pitch, as shown in FIG. 2, since the grown crystals have the same dimension and regularity in particle size.

In FIG. 2, d represents the diameter of a pore and "a" represents the interpore pitch. The upper limit of the dimension of the grown crystal can be controlled by appropriate selection of the interpore pitch a. The interpore pitch a must be larger than the particle size of the grown crystal to be obtained, and the interpore pitch is preferably 1 to 2 times the particle size of the crystal to be obtained, in view of productivity and quality (the crystal should be grown with high density).

The size of a grown crystal and the magnification of growth varies depending on the size of a seed crystal and desired dimension of the crystal. Generally, the crystal is preferably grown to at least five times, in particular preferably 5–10 times, as large as the seed crystal. When the crystal is grown to at least five times as large as the seed crystal, the crystal is imparted with excellent mechanical strength, even if the crystal if grown from a seed crystal. Incidentally, in view that the contacting surface is likely to have a large amount of impurities and the mechanical strength of the crystal may become low, more advantageous results would be obtained when the dimension of the seed crystal is set smaller relative to that of the grown crystal.

In order to place a seed crystal on the adhesive sheet with respect to a pore in a sieve portion of the rotary drum by means of rotating the drum, the sieve portion (the circumferential surface of the drum) preferably has a thickness of 20–50 µm. The thickness of the sieve portion is determined in consideration of the, strength of the sieve portion, stability of the seed crystal in the pore, and easy removability of the remaining seed crystals, which should not be placed on the adhesive sheet. No particular limitation is imposed on the material of the sieve portion (the circumferential surface of the drum), but the sieve portion may be made of, for example, stainless steel and desired pores may be formed on the portion through photo-etching or a laser-beam process.

After the seed crystals are placed on the adhesive sheet, the seed crystals are transferred from the sheet onto a supporting plate or a raw material plate; for example, a supporting metal plate, and the seed crystals are pressed against the plate. The supporting plate or the raw material plate is stacked onto the surface of the sheet on which the seed crystals are placed, and the supporting plate or the raw material plate is arbitrarily fixed by use of a backing tape. Subsequently, in the intervention of the adhesive sheet and the backing tape, pressure is applied to the seed crystals, and the seed crystals are pressed against the supporting plate or the raw material plate. The applied pressure varies with the material of the plate and the dimension of the seed crystal. When the adhesive sheet and the backing tape are peeled off the supporting plate or the raw material plate after the seed crystals are pressed against the plate, a satisfactory result is achieved when the seed crystals are not transferred onto the adhesive sheet or the backing tape. In this case, when the supporting plate or the raw material plate which the seed crystals are pressed against is stacked on another supporting plate or raw material plate, the seed crystals do not fall from the supporting plate or the raw material plate.

A preferred embodiment of an industrial process for placing seed crystals according to the present invention will next be described by way of FIG. 3.

The rotary drum 11 made of stainless steel contains a sieve portion having many pores of a predetermined diameter d at interpore pitch a on the circumferential surface as shown in FIG. 1. The sieve portion is not necessarily formed over the entire circumferential surface of the drum, and a plurality of the sieve portions may be formed on the circumferential surface of the drum in order to fit the dimension of a supporting plate. Alternatively, the entire circumferential surface may serve as the sieve portion, and an adhesive may be applied to a selected region on an adhesive tape (primary tape), such that the remaining seed crystals are not wasted. When a primary tape 13 is supplied from a primary tape supply roll 12 and the tape moves along with the circumferential surface of the rotary drum 11, in accordance with the rotation of the drum 11, the seed crystals are placed onto the adhesive surface of the primary tape through the pores of the sieve portion, corresponding to the regular pattern of the pores. Reference numeral 14 represents a roll for taking up a separated paper (separator) of the primary tape 13. A supporting metal plate 15 is stacked on the surface of the primary tape 13, on which the seed crystals are placed by means of the rotary drum 11. Subsequently, a backing tape 16 is supplied onto the supporting metal plate 15, so as to sandwich the plate 15 between the primary tape 13 and the backing tape 16. The laminate containing the tape is pressed by a press portion 17, and the seed crystals are pressed against the supporting metal plate 15. After the seed crystals are pressed against the plate, a kraft tape 18 is applied to the back side of the primary tape 13 for peeling off the tape. The kraft tape 18 is taken up by a roll 19 disposed above the laminate, and the backing tape 16 is taken up a roll 20 disposed below the laminate, to thereby detach the supporting metal plate 15 containing the seed crystals from the primary tape 13 and the backing tape 16.

A commercially available adhesive tape containing plastic tape formed of polyesters or other materials serving as substrate is preferably employed as the primary tape. The tape can be thinned to the extent that the tape is not torn. The upper limit of the thickness of the tape is preferably one-half or less the size of the seed crystal, more preferably one-third or less. When the tape is excessively thick, the seed crystals may be buried into the tape and may not be buried into the supporting plate or the raw material plate, and the seed crystals may not be pressed against the plate. In view of the foregoing, the thickness of the tape is preferably 5–100 µm, more preferably 8–15 µm. The adhesive strength of the tape is preferably 20–150 g/cm. When the adhesive strength is less than 20 g/cm, the tape is too weak to adhere to the seed crystals, whereas when the adhesive strength is in excess of 150 g/cm, the tape is easily torn.

A commercially available adhesive tape is preferably employed as the backing tape, and contains tape having a thickness of 100 µm or more, which is formed of paper, polyvinyl chloride, or other materials serving as substrate and has an adhesive strength of 10–100 g/cm. When the adhesive strength of the backing tape is less than 10 g/cm, the tape has insufficient ability to fix, whereas when the adhesive strength is in excess of 100 g/cm, the tape is difficult to peel off.

A commercially available adhesive tape may be employed as the kraft tape for peeling off the primary tape, so long as the kraft tape has greater adhesive strength than the primary tape.

As is described above, by employment of the method according to the present invention, seed crystals are placed in a regular pattern on an adhesive sheet by use of a sieve portion having pores formed in a regular pattern; and the seed crystals are transferred onto a supporting plate or a raw material plate and pressed against the plate, and consequently the seed crystals can be surely buried into the desired location of the plate with high reliability and at high speed. Therefore, processing efficiency is remarkably improved as compared with conventional methods.

When a raw material plate, a supporting plate, and seed crystals are stacked for producing a laminate by use of the supporting plate or the raw material plate which the seed crystals are pressed against, publicly known conditions are applicable to the dimensions and the alignment of the plates.

After formation of the laminate, diamond and cubic boron nitride crystals are grown at temperatures and pressures within the stable region of diamond and cubic boron nitride. In the case of diamond, the temperature and pressure within the stable region are typically 1,300–1,900° C. and 4.5–7.0 Gpa, respectively, and the crystal growth time is typically about 10–60 minutes. In the case of cubic boron nitride, the temperature and pressure in the stable region are typically 1,250–1,850° C. and 4.5–7.0 Gpa, respectively, and the crystal growth time is typically about 10–30 minutes.

In the reaction system as described above, if the number of seed crystals is determined such that the product of the desired mean growth amount per seed crystal and the number of the seed crystals corresponds to the desired total growth amount of diamond or cubic boron nitride which is produced by the above reaction, the crystal particles of diamond or cubic boron nitride having a desired particle size can be obtained with narrow distribution. In order to determine the desired total growth amount systematically, diamond or cubic boron nitride should be produced under different conditions of final load, so as to obtain different growth amounts. In order to produce a large amount of diamond or cubic boron nitride, a final load may be increased within an acceptable range for a production apparatus. However, when the density of the seed crystals is excessively high, the grown particles may interact with one another. Incidentally, in order to narrow grain size distribution effectively, the interpore pitch of the seed crystals in horizontal and vertical directions and the size of the seed crystals may be appropriately changed in consideration of the distribution of temperature and pressure in reaction portions.

The present invention will next be described in detail by way of examples. Unless otherwise indicated herein, all parts, percents, ratios and the like are by weight.

EXAMPLES

Example 1

Figure 3:
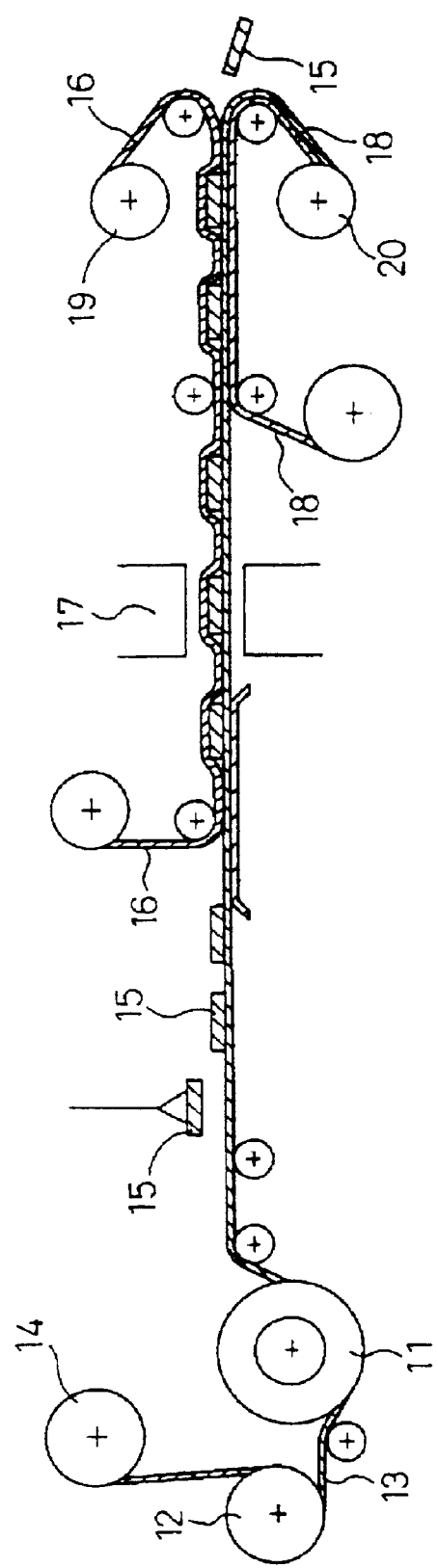
FIG. 3 is a schematic representation showing an industrial process according to the present invention for pressing seed crystals in a regular pattern against a supporting metal plate.

By use of apparatus assembly shown in FIG. 3, diamond seed crystals were pressed against a supporting metal plate, to thereby bury the crystals.

Diamond particles #325/400 (particle size 50–30 μm) were employed as the diamond seed crystals. A circular plate made of Fe 58-Ni 42 alloy (based on atomic %) having a diameter of 28 mm and a thickness of 0.25 mm was employed as the supporting metal plate.

Pores were formed in the sieve portion of a rotary drum such that the pores were arranged at a constant interpore pitch as shown in FIG. 2 and had a pore diameter of 70 μm and an interpore pitch of 700 μm.

The tapes described below were used in combination.

|  | Primary tape | Backing tape | Kraft tape |
| --- | --- | --- | --- |
| Material | polyester | poly(vinyl chloride) | paper |
| Adhesive strength | 100 g/cm | 60 g/cm | 150 g/cm |
| Thickness | 10 μm | 140 μm |  |

The load for pressing seed crystals against the supporting metal plate was 8 tons/plate.

By use of an apparatus as shown in FIG. 3 and under the above-described conditions, a supporting metal plate in which diamond seed crystals were buried through pressing was obtained.

In the thus-obtained supporting metal plate in which diamond seed crystals were buried through pressing, the seed crystals were buried so as to form a predetermined pattern with an average success rate as high as 98%. In a conventionally employed operation in which seed crystals are placed in depressions, the success rate was approximately 80%, which was obtained by the inventors' company and attributed to overflow loss of seed crystals, and the success rate depends on the precision of the operation. In addition, the efficiency of the operation for placing seed crystals (evaluated in terms of the time required for the operation) increased as compared to a conventional operation in which seed crystals were placed in depressions. Even though the time for plating of seed crystals was subtracted from the time for the conventional operation, the time was shortened to 1/30.

In a vessel made of pyrophyllite having an inside diameter of 28 mm and a height of 38 mm, a plurality of the above-described supporting metal plates in which diamond seed crystals were buried through pressing (diameter of 28 mm, thickness 0.25 mm) and a plurality of graphite plates having the same diameter and a thickness of 1.6 mm were alternately stacked, to thereby fabricate a reaction portion. Both the top and bottom surfaces of the laminate were graphite plates. The laminate was capped with an iron-made cap, and loaded in a belt-type ultra-high-pressure production apparatus.

The laminate was heated in the belt-type ultra-high-pressure production apparatus, and the reaction portion was "directly" heated through application of voltage. The reaction was carried out under the following conditions: an initial pressure of 5.0 GPa was applied; temperature was elevated to 1,450° C.; and the temperature was maintained for 20 minutes.

The above process produced approximately 5 g of diamond, and 48% of the diamond particles had a grain size falling within the range of 425 to 300 μm, whereas approximately 30% of the diamond particles had a similar grain size when diamond was produced from crystal nuclei generated at random without placing seed crystals in a regular pattern.

From the above-described diamond particles having a grain size falling within the range of 425 to 300 μm, those having a grain size falling within the range of 384 to 322 μm were selected through classification. Particles having a blocky shape were further isolated from the above selected particles. Particles exhibiting weak magnetism; i.e., particles which did not bond to a magnetic rod (1.2 T (tesla)), were selected and subjected to measurement of compressive fracture strength of a single particle. The strength was measured for diamond particles which had not been heat-treated and diamond particles which had been fired at 1,000° C. for one hour in vacuum. The measured values represent average values for 50 particles.

The results show that the diamond particles as such had a compressive fracture strength of 25.5 kgf, and those which had been fired had a compressive fracture strength of 24.0 kgf.

Example 2

In a hollow cylinder made of graphite having an outside diameter of 28 mm, an inside diameter of 26 mm, and a length of 38 mm, a plurality of plates having a diameter of 26 mm and a thickness of 1.4 mm and comprising hexagonal boron nitride (hBN) serving as a reactive substance and $LiCaBN_2$ (hBN:$LiCaBN_2$=100:15 weight base), and a plurality of copper plates having the same diameter and a thickness of 100 μm were alternately stacked. In the copper plates, cubic boron nitride particles having a grain size of 60–80 μm were arranged in a regular pattern and buried in advance in a manner similar to that of Example 1, except that the interparticle pitch was 400 μm. Each end of the graphite hollow cylinder stuffed with the laminate was capped with a graphite plate to cover a mixture of (hBN) and $LiCaBN_2$, since the mixture was electrically non-conductive. The thus-processed cylinder was placed in a sleeve made of pyrophyllite having an inside diameter of 28 mm and capped with a cap made of iron. The sleeve was treated in the same apparatus as employed in Example 1 under the following conditions: a pressure of 5.7 GPa was applied; temperature was elevated to 1,450° C.; and the temperature was maintained for 15 minutes. Heating was carried out through application of electricity to the graphite cylinder.

The above process produced 7.3 g of cBN, and 45% of the cBN particles had a grain size falling within the range of 250 to 300 μm. Among the particles having the above grain size, approximately 80% of the particles had a translucent brown color and a blocky shape.

Through a conventional method, through-holes having a diameter of 80 μm were formed in a copper plate having a thickness of 100 μm, and a seed crystal having a diameter of 60–80 μm was held in each hole. When a laminate including such a copper plate was employed, the yield of cBN was 5.2 g.

The difference between the Example method and the conventional method is that seed crystals were firmly fixed in the above Example.

Comparative Example

In a supporting plate formed of the same material and having the same diameter as described in Example 1, pores having a diameter of 120 μm, a depth of 120 μm, and an interpore pitch of 700 μm were provided in a regular pattern. Into these pores, diamond seed crystals #270/325 which had been electroplated with Ni to a thickness of 20 μm were dropped by hand while vibration was imparted thereto. A plurality of the metal plates containing the dropped seed crystals and a plurality of metal plates having a diameter of 28 mm and a thickness of 1.6 mm were alternately stacked, to thereby fabricate a laminate having the same number of layers as the laminate fabricated in Example 1.

The procedure of Example 1 was repeated such that 5.0 GPa and 1,450° C. were maintained for 20 minutes.

The overall time of the operation, including plating, was 90 minutes, which indicated that the process has very poor efficiency as compared to the process of Example 1, which had an overall time of 3 minutes.

The yield of the thus-produced diamond particles was 3.8–4.2 g, which is 75–85% the yield obtained in Example 1. The low yield was attributed to the efficiency of filling pores with seed crystals being lower than that obtained in Example 1.

The grain size distribution was similar to that observed in Example 1.

The compressive fracture strength was measured in a manner similar to that employed in Example 1. The diamond particles as such had a compressive fracture strength of 22.1 kgf, and those which had been fired had a compressive fracture strength of 19.8 kgf. These strengths were slightly lowered as compared with the diamond particles of Example 1. This is attributed to migration of impurities during coating of seed crystals with nickel.

The present invention provides a method for producing diamond or cubic boron nitride crystals having excellent mechanical strength and uniform grain size, which method comprises placing seed crystals in a regular pattern on a supporting plate or a raw material plate with high efficiency and regulating the temperature and pressure conditions at a reaction portion to target values in an industrial ultra-high-pressure production apparatus.

While the invention has been described in detail and with reference to specific embodiments thereof, it will be apparent to one skilled in the art that various changes and modifications can be made therein without departing from the spirit and scope thereof.

What is claimed is:

1. A method for growing diamond crystals or cubic boron nitride crystals at a pressure and temperature within a diamond or cubic boron nitride stable region, which comprises:

stacking a supporting layer and a raw material formed of non-diamond carbon species or low-pressure-phase boron nitride, placing a plurality of seed crystals such that the seed crystals come in contact with the supporting layer, wherein the seed crystals are placed in a regular pattern on a supporting plate or a raw material plate by placing the seed crystals on an adhesive sheet through pores formed in a regular pattern, transferring the regularly-placed seed crystals on the adhesive sheet onto the surface of the supporting plate or the raw material plate, and pressing the seed crystals against the surface; and the supporting plate or the raw material plate is used as the supporting layer or the raw material layer for growing the crystals.

2. A method for growing materials according to claim 1, further comprising placing the seed crystals into a rotary-drum vessel having pores arranged in a regular pattern on the circumferential surface to place the seed crystals in a regular pattern on the adhesive sheet, rotating the vessel along with the adhesive sheet, and causing the seed crystals to adhere through the regularly-patterned pores of the vessel on the adhesive sheet.

3. A method for growing crystals according to claim 1 or 2, further comprising peeling the supporting plate or the raw material plate off the adhesive sheet.

4. A method for growing crystals according to claim 1 or 2, further comprising stacking another supporting plate on the surface of the supporting plate on which the seed crystals have been placed in a regular pattern to form a laminate, and stacking the raw material plate on the laminate.

5. A method for growing crystals according to claim 1 or 2, further comprising forming the pores at a constant interpore pitch, wherein the pores have a size such that only one of the seed crystals passes through each pore.

6. A method for growing crystals according to claim 1 or 2, wherein the thickness of the adhesive sheet is one-half or less the mean particle size of the seed crystal.

7. A method for growing crystals according to claim 3, further comprising stacking another supporting plate on the surface of the supporting plate on which the seed crystals have been placed in a regular pattern to form a laminate, and stacking the raw material plate on the laminate.

8. A method for growing crystals according to claim 3, further comprising forming the pores at a constant interpore pitch, wherein the pores have a size such that only one of the seed crystals passes through each pore.

9. A method for growing crystals according to claim 4, further comprising forming the pores at a constant interpore pitch, wherein the pores have a size such that only one of the seed crystals passes through each pore.

10. A method for growing crystals according to claim 3, wherein the thickness of the adhesive sheet is one-half or less the mean particle size of the seed crystal.

11. A method for growing crystals according to claim 4, wherein the thickness of the adhesive sheet is one-half or less the mean particle size of the seed crystal.

12. A method for growing crystals according to claim 5, wherein the thickness of the adhesive sheet is one-half or less the mean particle size of the seed crystal.

* * * * *